US012674237B2

(12) United States Patent
Choi et al.

(10) Patent No.: US 12,674,237 B2
(45) Date of Patent: Jul. 7, 2026

(54) HYDROGEN SUPPLY SYSTEM

(71) Applicants: HYUNDAI MOTOR COMPANY, Seoul (KR); KIA CORPORATION, Seoul (KR)

(72) Inventors: Seung Hyeon Choi, Seoul (KR); Ji Hye Park, Seoul (KR)

(73) Assignees: Hyundai Motor Company, Seoul (KR); KIA Corporation, Seoul (KR)

( * ) Notice: Subject to any disclaimer, the term of this patent is extended or adjusted under 35 U.S.C. 154(b) by 771 days.

(21) Appl. No.: 17/701,113

(22) Filed: Mar. 22, 2022

(65) Prior Publication Data

US 2023/0141308 A1 May 11, 2023

(30) Foreign Application Priority Data

Nov. 5, 2021 (KR) ......................... 10-2021-0151750

(51) Int. Cl.
*C25B 1/04* (2021.01)
(52) U.S. Cl.
CPC ................. *C25B 1/04* (2013.01); *Y02E 60/36* (2013.01)
(58) Field of Classification Search
CPC .................................. C25B 1/04; C01B 3/065
See application file for complete search history.

(56) References Cited

U.S. PATENT DOCUMENTS

| | | | | |
|---|---|---|---|---|
| 4,248,048 A | * | 2/1981 | Smith, Jr. | ............... F02B 45/02 60/645 |
| 6,099,811 A | | 8/2000 | Stetson et al. | |

| | | | | |
|---|---|---|---|---|
| 2004/0131902 A1 | * | 7/2004 | Frank | ...................... C25B 15/02 204/266 |
| 2006/0125241 A1 | * | 6/2006 | DuHamel | ................. F03D 9/25 290/44 |
| 2010/0230292 A1 | * | 9/2010 | Kelly | .................. H01M 8/0656 205/637 |
| 2021/0309517 A1 | * | 10/2021 | Russell | .............. B01D 53/0423 |

FOREIGN PATENT DOCUMENTS

| | | |
|---|---|---|
| JP | 2015-092107 A | 5/2015 |
| KR | 10-2065974 B1 | 1/2020 |
| KR | 2020-0099189 A | 8/2020 |
| KR | 10-2201823 B1 | 1/2021 |
| KR | 2021-0078677 A | 6/2021 |

OTHER PUBLICATIONS

Tsuji et al., Original & Machine Translation, JP 200766812 A (Year: 2007).*
Inchem, Titanium Dioxide (Year: 2019).*

* cited by examiner

*Primary Examiner* — Hosung Chung
(74) *Attorney, Agent, or Firm* — McDonnell Boehnen Hulbert & Berghoff LLP

(57) ABSTRACT

An embodiment of the present disclosure relates to a hydrogen supply system including a water electrolysis stack configured to produce hydrogen by electrochemically decomposing water, and a metal hydride compressor connected to the water electrolysis stack and configured to treat the hydrogen before supplying the hydrogen to a supply destination, thereby obtaining an advantageous effect of simplifying a structure and improving spatial utilization and a degree of design freedom.

5 Claims, 5 Drawing Sheets

10

HYDROGEN SUPPLY SYSTEM

CROSS REFERENCE TO RELATED APPLICATION

This application claims priority to and the benefit of Korean Patent Application No. 10-2021-0151750 filed in the Korean Intellectual Property Office on Nov. 5, 2021, the entire contents of which are incorporated herein by reference.

TECHNICAL FIELD

An embodiment of the present disclosure relates to a hydrogen supply system, and more particularly, to a hydrogen supply system capable of simplifying a structure and a treatment process and improving a degree of design freedom and spatial utilization.

BACKGROUND

There is an increasing need for research and development on alternative energy to cope with global warming and depletion of fossil fuel. Hydrogen energy is attracting attention as a practical solution for solving environment and energy issues.

In particular, because hydrogen has high energy density and properties suitable for application in a grid-scale, hydrogen is in the limelight as a future energy carrier.

A water electrolysis stack, which is one of electrochemical devices, refers to a device that produces hydrogen and oxygen by electrochemically decomposing water. The water electrolysis stack may be configured by stacking several tens or several hundreds of water electrolysis cells (unit cells) in series.

The water electrolysis cell may include a membrane electrode assembly (MEA), and porous transport layers and separators respectively disposed at two opposite sides of the membrane electrode assembly.

Meanwhile, hydrogen produced by the water electrolysis stack may contain oxygen and moisture vapor due to crossover and natural evaporation in the membrane electrode assembly. If hydrogen supplied to (stored in) a supply destination (e.g., a storage tank) from the water electrolysis stack contains oxygen and moisture (moisture vapor), a risk of explosion increases, and safety and reliability deteriorate. Therefore, oxygen and moisture vapor contained in hydrogen need to be maximally removed before hydrogen produced by the water electrolysis stack is supplied to the supply destination.

However, in the related art, refinement facilities, such as a water trap, a dryer, and an oxygen separator, need to be separately provided to remove oxygen and moisture from hydrogen produced by the water electrolysis stack, which complicates a structure and degrades spatial utilization and a degree of design freedom.

In addition, in the related art, the production of hydrogen needs to be stopped during a process of removing oxygen and moisture from hydrogen produced by the water electrolysis stack, which degrades production efficiency and increases manufacturing costs.

Therefore, recently, various studies have been conducted to simplify the structure for removing oxygen and moisture from hydrogen produced by the water electrolysis stack and improve the spatial utilization and the degree of design freedom, but the study results are still insufficient. Accordingly, there is a need to develop a technology to simplify the structure for removing oxygen and moisture from hydrogen produced by the water electrolysis stack and improve the spatial utilization and the degree of design freedom.

SUMMARY

The present disclosure has been made in an effort to provide a hydrogen supply system capable of simplifying a structure and a treatment process and improving spatial utilization and a degree of design freedom.

In particular, the present disclosure has been made in an effort to effectively remove oxygen and moisture from hydrogen produced by a water electrolysis stack without separately providing a plurality of refinement facilities (e.g., a water trap, a dryer, and an oxygen separator) for removing oxygen and moisture from hydrogen produced by the water electrolysis stack.

The present disclosure has also been made in an effort to compress or store hydrogen while refining hydrogen produced by a water electrolysis stack by using only a single metal hydride compressor.

The present disclosure has also been made in an effort to improve production efficiency and reduce manufacturing costs.

The present disclosure has also been made in an effort to simplify a structure and process for regenerating a metal hydride compressor.

The objects to be achieved by the embodiments are not limited to the above-mentioned objects, but also include objects or effects that may be understood from the solutions or embodiments described below.

An exemplary embodiment of the present disclosure provides a hydrogen supply system including a water electrolysis stack configured to produce hydrogen by electrochemically decomposing water, and a metal hydride compressor connected to the water electrolysis stack and configured to treat the hydrogen before supplying the hydrogen to a supply destination.

This is to simplify a structure of the hydrogen supply system and improve a degree of design freedom and spatial utilization.

That is, if hydrogen supplied to (stored in) a supply destination (e.g., a storage tank) from the water electrolysis stack contains oxygen and moisture (moisture vapor), a risk of explosion increases, and safety and reliability deteriorate. Therefore, oxygen and moisture vapor contained in hydrogen need to be maximally removed before hydrogen produced by the water electrolysis stack is supplied to the supply destination. However, in the related art, separate facilities (e.g., a water trap, a dryer, and an oxygen separator) need to be additionally provided to remove oxygen and moisture from hydrogen produced by the water electrolysis stack, which complicates a structure and degrades spatial utilization and a degree of design freedom.

However, according to the embodiment of the present disclosure, the hydrogen produced by the water electrolysis stack may be treated by the metal hydride compressor made of a metal hydride material before the hydrogen is supplied to the supply destination. Therefore, it is possible to obtain an advantageous effect of simplifying the structure and improving the spatial utilization and degree of design freedom.

Among other things, according to the embodiment of the present disclosure, since the hydrogen produced by the water electrolysis stack may be treated by the metal hydride compressor, the process of refining the hydrogen (removing oxygen and moisture) may be performed only by the single metal hydride compressor. Thus, it is not necessary to separately provide the water trap, the dryer, and the oxygen separator that are used to remove the oxygen and moisture contained in the hydrogen. Therefore, it is possible to simplify the structure and treatment process and improve the spatial utilization and degree of design freedom.

Moreover, to store the hydrogen produced by the water electrolysis stack in a storage facility such as a high-pressure tank, a separate compressor needs to be used to compress the hydrogen produced by the water electrolysis stack. However, the metal hydride compressor may serve as both the compressor for compressing the hydrogen and the storage facility (e.g., the high-pressure tank) for storing the hydrogen, which makes it possible to compress and store the hydrogen without separately providing the compressor and the storage facility. Therefore, it is possible to obtain an advantageous effect of further simplifying the structure and treatment process and further improving the spatial utilization and degree of design freedom.

According to the exemplary embodiment of the present disclosure, the metal hydride compressor may refine, store, and compress the hydrogen.

In particular, the metal hydride material of the metal hydride compressor may be a material with resistance against oxygen and moisture (water) (e.g., a material that may be oxidized). For example, the metal hydride compressor may be made of a material containing at least any one of lanthanum (La) and titanium (Ti).

According to the exemplary embodiment of the present disclosure, the hydrogen supply system may include a supply line connected to the metal hydride compressor and configured to supply the supply destination with the hydrogen treated by the metal hydride compressor, and a discharge line connected to the metal hydride compressor and configured to discharge impurities (oxygen and moisture) separated from the hydrogen to the outside.

According to the exemplary embodiment of the present disclosure, the hydrogen supply system may include a storage unit configured to store the hydrogen independently of the metal hydride compressor, a bypass line having one end connected to the supply line and the other end connected to the storage unit and configured to selectively allow the hydrogen to flow from the supply line to the storage unit, and a regeneration line having one end connected to the storage unit and the other end connected to the metal hydride compressor and configured to selectively supply the hydrogen from the storage unit to the metal hydride compressor.

The metal hydride compressor may be regenerated since a part of the high-purity hydrogen moving along the supply line is supplied back to the metal hydride compressor via the bypass line, the storage unit, and the regeneration line as described above.

That is, the oxidized metal hydride material needs to be reduced (regenerated) to its original state to maintain the refinement performance of the metal hydride compressor. The metal hydride compressor may be regenerated by supplying the high-purity hydrogen into the metal hydride compressor.

In the embodiment of the present disclosure, a part of the high-purity hydrogen moving along the supply line may be moved to and stored in the storage unit, and the hydrogen stored in the storage unit may be supplied to the metal hydride compressor at a point in time at which the metal hydride compressor is required to be regenerated. Therefore, the metal hydride compressor may be consistently regenerated without additionally providing a separate hydrogen supply source for supplying hydrogen required to regenerate the metal hydride compressor. Therefore, it is possible to obtain an advantageous effect of simplifying the structure and process for regenerating the metal hydride compressor and improving the degree of design freedom and spatial utilization.

According to the exemplary embodiment of the present disclosure, the storage unit may be made of a metal hydride material.

Since the storage unit is made of the metal hydride material as described above, the storage unit itself may have the refinement performance. Therefore, it is possible to obtain an advantageous effect of further improving the purity of the hydrogen to be supplied to the metal hydride compressor via the storage unit. Therefore, it is possible to obtain an advantageous effect of further improving the efficiency in regenerating the metal hydride compressor and reducing the time required for the regeneration.

In addition, since the storage unit is made of the metal hydride material, the hydrogen may be compressed and discharged through the repeated heating and cooling processes of the storage unit, such that there is no need for an additional device such as a pump for supplying the metal hydride compressor with the hydrogen in the storage unit. Therefore, it is possible to obtain an advantageous effect of simplifying the structure and further improving the degree of design freedom and spatial utilization.

Another exemplary embodiment of the present disclosure provides a hydrogen supply system including a water electrolysis stack configured to produce hydrogen by electrochemically decomposing water, a first metal hydride compressor connected to the water electrolysis stack and configured to treat the hydrogen before supplying the hydrogen to a supply destination, a second metal hydride compressor connected to the water electrolysis stack in parallel with the first metal hydride compressor and configured to treat the hydrogen before supplying the hydrogen to the supply destination, a first supply line connected to the first metal hydride compressor and configured to supply the hydrogen to the supply destination, a first bypass line having one end connected to the first supply line and the other end connected to the second metal hydride compressor and configured to selectively allow the hydrogen to flow from the first supply line to the second metal hydride compressor, a second supply line connected to the second metal hydride compressor and configured to supply the hydrogen to the supply destination, and a second bypass line having one end connected to the second supply line and the other end connected to the first metal hydride compressor and configured to selectively allow the hydrogen to flow from the second supply line to the first metal hydride compressor.

According to the exemplary embodiment of the present disclosure, the first metal hydride compressor may refine, store, and compress the hydrogen, and the second metal hydride compressor may refine, store, and compress the hydrogen while operating alternately with the first metal hydride compressor.

According to the embodiment of the present disclosure described above, since the first metal hydride compressor and the second metal hydride compressor operate alternately, the second metal hydride compressor may be regenerated while the first metal hydride compressor treats the hydrogen, and the first metal hydride compressor may be regenerated while the second metal hydride compressor treats the hydrogen. Therefore, it is possible to continuously treat the hydrogen produced by the water electrolysis stack without stopping the production of the hydrogen. Therefore, the high-purity hydrogen may be continuously supplied to the supply destination, which makes it possible to obtain an advantageous effect of improving the efficiency in producing hydrogen and reducing the manufacturing costs.

According to the exemplary embodiment of the present disclosure, the first metal hydride compressor and the second metal hydride compressor may each be made of a material containing at least any one of lanthanum (La) and titanium (Ti).

DETAILED DESCRIPTION

Hereinafter, exemplary embodiments of the present disclosure will be described in detail with reference to the accompanying drawings.

However, the technical spirit of the present disclosure is not limited to some embodiments described herein but may be implemented in various different forms. One or more of the constituent elements in the embodiments may be selectively combined and substituted for use within the scope of the technical spirit of the present disclosure.

In addition, unless otherwise specifically and explicitly defined and stated, the terms (including technical and scientific terms) used in the embodiments of the present disclosure may be construed as the meaning which may be commonly understood by the person with ordinary skill in the art to which the present disclosure pertains. The meanings of the commonly used terms such as the terms defined in dictionaries may be interpreted in consideration of the contextual meanings of the related technology.

In addition, the terms used in the embodiments of the present disclosure are for explaining the embodiments, not for limiting the present disclosure.

In the present specification, unless particularly stated otherwise, a singular form may also include a plural form. The expression "at least one (or one or more) of A, B, and C" may include one or more of all combinations that can be made by combining A, B, and C.

In addition, the terms such as first, second, A, B, (a), and (b) may be used to describe constituent elements of the embodiments of the present disclosure.

These terms are used only for the purpose of discriminating one constituent element from another constituent element, and the nature, the sequences, or the orders of the constituent elements are not limited by the terms.

Further, when one constituent element is described as being 'connected', 'coupled', or 'attached' to another constituent element, one constituent element may be connected, coupled, or attached directly to another constituent element or connected, coupled, or attached to another constituent element through still another constituent element interposed therebetween.

In addition, the expression "one constituent element is provided or disposed above (on) or below (under) another constituent element" includes not only a case in which the two constituent elements are in direct contact with each other, but also a case in which one or more other constituent elements are provided or disposed between the two constituent elements. The expression "above (on) or below (under)" may mean a downward direction as well as an upward direction based on one constituent element.

Figure 1:
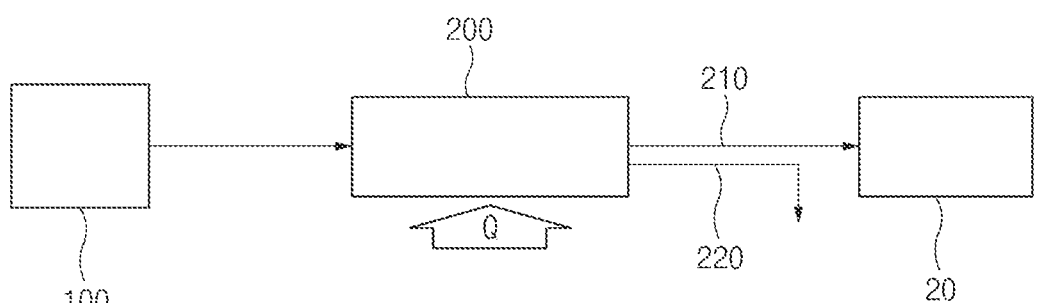
FIG. 1 is a view for explaining a hydrogen supply system according to an embodiment of the present disclosure.
Figure 2:
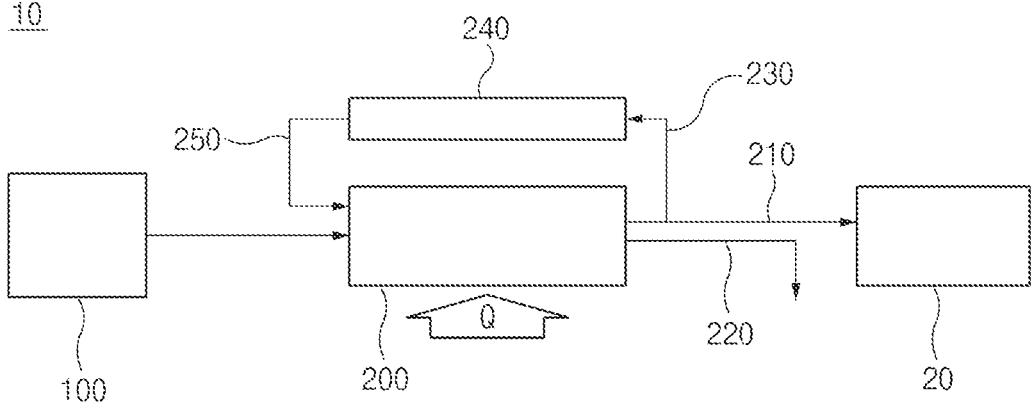
FIG. 2 is a view for explaining a process of regenerating a metal hydride compressor of the hydrogen supply system according to the embodiment of the present disclosure.

Referring to FIGS. 1 and 2, a hydrogen supply system 10 according to an embodiment of the present disclosure includes a water electrolysis stack 100 configured to produce hydrogen by electrochemically decomposing water, and a metal hydride compressor 200 connected to the water electrolysis stack 100 and configured to treat hydrogen before supplying the hydrogen to a supply destination 20.

The hydrogen supply system 10 according to the embodiment of the present disclosure may be used to supply high-purity hydrogen to various supply destinations (demanders) 20 in accordance with required conditions and design specifications. The present disclosure is not restricted or limited by the type and properties of the supply destination 20 to which the hydrogen supply system 10 is applied.

The water electrolysis stack 100 serves to produce hydrogen and oxygen by decomposing water (a reaction fluid) through an electrochemical reaction.

The water electrolysis stack 100 may have various structures capable of producing hydrogen and oxygen by decomposing the reaction fluid through the electrochemical reaction. The present disclosure is not restricted or limited by the type and structure of the water electrolysis stack 100.

For example, the water electrolysis stack 100 may be made by stacking a plurality of unit cells (not illustrated) in a preset reference stacking direction.

More specifically, the unit cell may include a reaction layer (not illustrated), and separators (not illustrated) respectively stacked on two opposite surfaces of the reaction layer. The water electrolysis stack 100 may be configured by stacking the plurality of unit cells in the reference stacking direction and then fastening endplates (not illustrated) to two opposite ends of the stack of the plurality of unit cells.

The reaction layer may have various structures capable of generating the electrochemical reaction of the reaction fluid (e.g., water). The present disclosure is not restricted or limited by the type and structure of the reaction layer.

For example, the reaction layer may include a membrane electrode assembly (MEA) (not illustrated), a first porous transport layer (not illustrated) in close contact with one surface of the membrane electrode assembly, and a second porous transport layer (not illustrated) in close contact with the other surface of the membrane electrode assembly.

The membrane electrode assembly may be variously changed in structure and material in accordance with required conditions and design specifications. The present disclosure is not restricted or limited by the structure and material of the membrane electrode assembly.

For example, the membrane electrode assembly may be configured by attaching catalyst electrode layers (e.g., an anode electrode layer and a cathode electrode layer), in which electrochemical reactions are generated, to two opposite surfaces of an electrolyte membrane.

The first and second porous transport layers may uniformly distribute the reaction fluid and each have a porous structure having pores with predetermined sizes.

For reference, water supplied to the anode electrode layer, which is an oxidation electrode for the water electrolysis, is separated into hydrogen ions (protons), electrons, and oxygen. The hydrogen ions move to the cathode electrode layer, which is a reduction electrode, through the electrolyte membrane, and the electrons move to a cathode through an external circuit. In addition, the oxygen may be discharged through an anode outlet, and the hydrogen ions and the electrons may be converted into hydrogen at the cathode.

The metal hydride compressor 200 is connected to the water electrolysis stack 100 and treats hydrogen produced by the water electrolysis stack 100 before supplying the hydrogen to the supply destination 20.

In this case, the configuration in which the metal hydride compressor 200 treats the hydrogen may mean that the metal hydride compressor 200 is used to refine, store, and compress the hydrogen.

In addition, in the embodiment of the present disclosure, the refinement of hydrogen may be understood as a process of separating impurities, such as oxygen and moisture contained in hydrogen, from the hydrogen.

The metal hydride compressor 200 is a metal hydride-based thermal compressor. The metal hydride compressor 200 may serve to remove impurities (oxygen and moisture) contained in hydrogen by using the properties of the metal hydride material, compress the hydrogen through a process of repeatedly heating and cooling the hydrogen, and store the hydrogen.

The metal hydride compressor 200 may have various structures and shapes having a storage space therein. The present disclosure is not restricted or limited by the structure and shape of the metal hydride compressor 200.

For reference, a metal hydride material (solid storage material) of the metal hydride compressor 200 may be variously changed in type in accordance with required conditions and design specifications. The present disclosure is not restricted or limited by the type of metal hydride material.

In particular, the metal hydride material of the metal hydride compressor 200 may be a material with resistance against oxygen and moisture (water) (e.g., a material that may be oxidized).

For example, the metal hydride compressor 200 may be made of a material containing at least any one of lanthanum (La) and titanium (Ti).

As described above, in the embodiment of the present disclosure, the hydrogen produced by the water electrolysis stack 100 may be treated by the metal hydride compressor 200 before being supplied to the supply destination 20, and the metal hydride compressor 200 may be made of the metal hydride material with resistance against oxygen and moisture (water). Therefore, it is possible to separate (remove) oxygen and moisture from hydrogen introduced into the metal hydride compressor 200, discharge only the high-purity hydrogen to the outside of the metal hydride compressor 200, and supply the hydrogen to the supply destination 20.

More specifically, when hydrogen is supplied to the metal hydride compressor 200 made of the metal hydride material with resistance against oxygen and moisture (water), the hydrogen and the metal (metal hydride material) form a hydrogen compound. When a small amount of oxygen and moisture, together with the hydrogen, is introduced into the metal hydride compressor 200, the metal forms a small amount of metal oxide (e.g., $M+O_2$ (or $H_2O$)→$MO_2+H_2+$ heat (Q)).

When a temperature and pressure of the metal hydride compressor 200 reach a predetermined condition (e.g., a temperature and pressure at which the metal oxide is not decomposed) by heat Q applied to the metal hydride compressor 200 in a state in which hydrogen (hydrogen containing oxygen and moisture) is stored in the metal hydride compressor 200, only the high-purity hydrogen may be discharged to the outside of the metal hydride compressor 200, and the metal oxide remains in the metal hydride compressor 200.

For reference, in the case in which the metal hydride compressor 200 is made of a lanthanum-based (La-based) material, the metal hydride compressor 200 may maintain the performance in refining hydrogen (performance in separating oxygen and moisture) through the consistent reduction reaction (regeneration) even though a small amount of oxygen and moisture is introduced into the metal hydride compressor 200.

According to the exemplary embodiment of the present disclosure, the hydrogen supply system 10 may include a supply line 210 connected to the metal hydride compressor 200 and configured to supply the supply destination 20 with the hydrogen treated by the metal hydride compressor 200, and a discharge line 220 connected to the metal hydride compressor 200 and configured to discharge impurities (oxygen and moisture) separated from the hydrogen to the outside.

The supply line 210 may have various structures capable of supplying the supply destination 20 with the hydrogen treated (refined, compressed, and stored) by the metal hydride compressor 200. The present disclosure is not restricted or limited by the structure and shape of the supply line 210.

The discharge line 220 may have various structures capable of discharging the oxygen and moisture separated from the hydrogen by the metal hydride compressor 200 to the outside of the metal hydride compressor 200. The present disclosure is not restricted or limited by the structure and shape of the discharge line 220.

The high-purity hydrogen discharged from the metal hydride compressor 200 may be supplied to the supply destination 20 along the supply line 210, and the impurities (oxygen and moisture) separated from the hydrogen may be discharged to the outside of the metal hydride compressor 200 through the discharge line 220.

Referring to FIG. 2, according to the exemplary embodiment of the present disclosure, the hydrogen supply system 10 may include a storage unit 240 configured to store hydrogen independently of the metal hydride compressor 200, a bypass line 230 having one end connected to the supply line 210 and the other end connected to the storage unit 240 and configured to selectively allow the hydrogen to flow from the supply line 210 to the storage unit 240, and a regeneration line 250 having one end connected to the storage unit 240 and the other end connected to the metal hydride compressor 200 and configured to selectively supply the hydrogen from the storage unit 240 to the metal hydride compressor 200.

The storage unit 240 may have various structures and materials capable of storing hydrogen therein. The present disclosure is not restricted or limited by the structure and properties of the storage unit 240.

The bypass line 230 serves to selectively allow the hydrogen (high-purity hydrogen) moving along the supply line 210 to flow to the storage unit 240. The regeneration line 250 serves to selectively supply the metal hydride compressor 200 with the hydrogen stored in the storage unit 240.

With the above-mentioned structure, a part of the high-purity hydrogen moving along the supply line 210 may be supplied to the metal hydride compressor 200 via the bypass line 230, the storage unit 240, and the regeneration line 250.

This is to regenerate the metal hydride compressor 200 using the high-purity, high-pressure hydrogen discharged from the metal hydride compressor 200.

That is, the oxidized metal hydride material needs to be reduced (regenerated) to its original state to maintain the refinement performance of the metal hydride compressor 200. The metal hydride compressor 200 may be regenerated by supplying the high-purity hydrogen into the metal hydride compressor 200.

In the embodiment of the present disclosure, a part of the high-purity hydrogen moving along the supply line 210 may be moved to and stored in the storage unit 240, and the hydrogen stored in the storage unit 240 may be supplied to the metal hydride compressor 200 at a point in time at which the metal hydride compressor 200 is required to be regenerated. Therefore, the metal hydride compressor 200 may be consistently regenerated without additionally providing a separate hydrogen supply source for supplying hydrogen required to regenerate the metal hydride compressor 200. Therefore, it is possible to obtain an advantageous effect of simplifying the structure and process for regenerating the metal hydride compressor 200 and improving the degree of design freedom and spatial utilization.

According to the exemplary embodiment of the present disclosure, the storage unit 240 may be made of a metal hydride material identical or similar to the material of the metal hydride compressor 200.

Since the storage unit 240 is made of the metal hydride material as described above, the storage unit 240 itself may have the refinement performance. Therefore, it is possible to obtain an advantageous effect of further improving the purity of the hydrogen to be supplied to the metal hydride compressor 200 via the storage unit 240. Therefore, it is possible to obtain an advantageous effect of further improving the efficiency in regenerating the metal hydride compressor 200 and reducing the time required for the regeneration.

In addition, since the storage unit 240 is made of the metal hydride material, the hydrogen may be compressed and discharged through the repeated heating and cooling processes of the storage unit 240, such that there is no need for an additional device such as a pump for supplying the metal hydride compressor 200 with the hydrogen in the storage unit 240. Therefore, it is possible to obtain an advantageous effect of simplifying the structure and further improving the degree of design freedom and spatial utilization.

In the embodiment of the present disclosure illustrated and described above, the example has been described in which the hydrogen supply system 10 includes only the single metal hydride compressor 200. However, according to another embodiment of the present disclosure, a plurality of metal hydride compressors may be used to constitute the hydrogen supply system.

Figure 3:
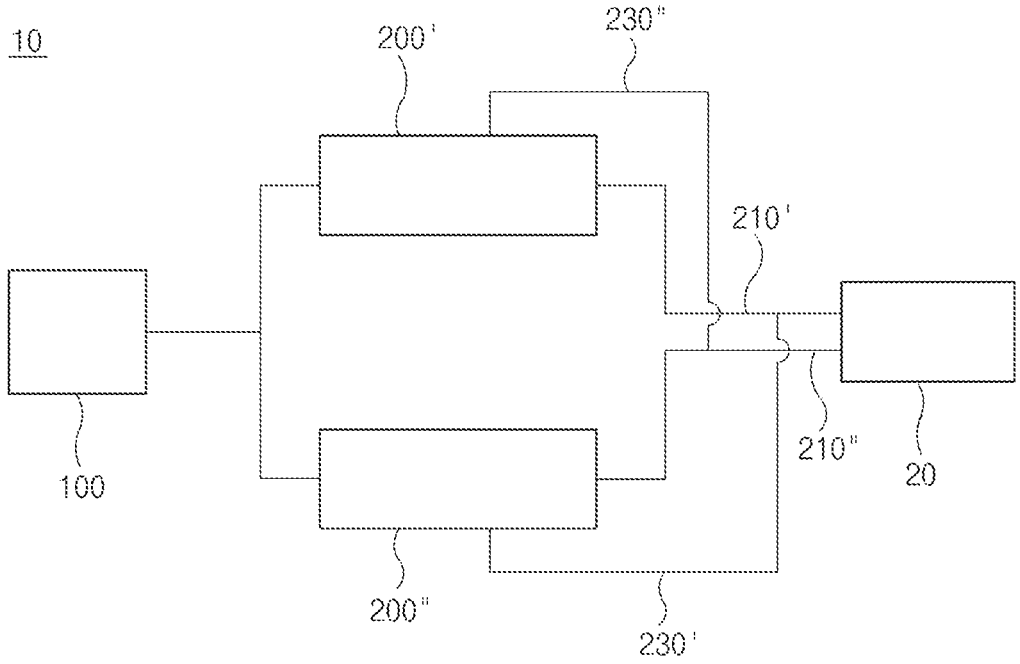
FIG. 3 is a view for explaining a hydrogen supply system according to another embodiment of the present disclosure.
Figure 4:
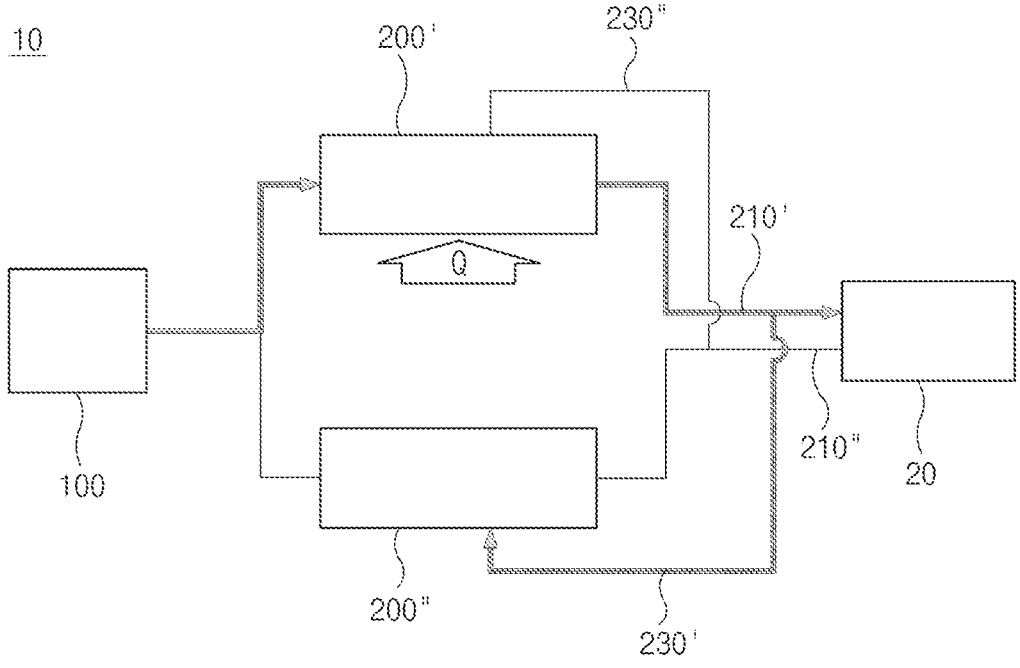
FIG. 4 is a view for explaining a process of treating hydrogen by using a first metal hydride compressor of the hydrogen supply system according to another embodiment of the present disclosure.
Figure 5:
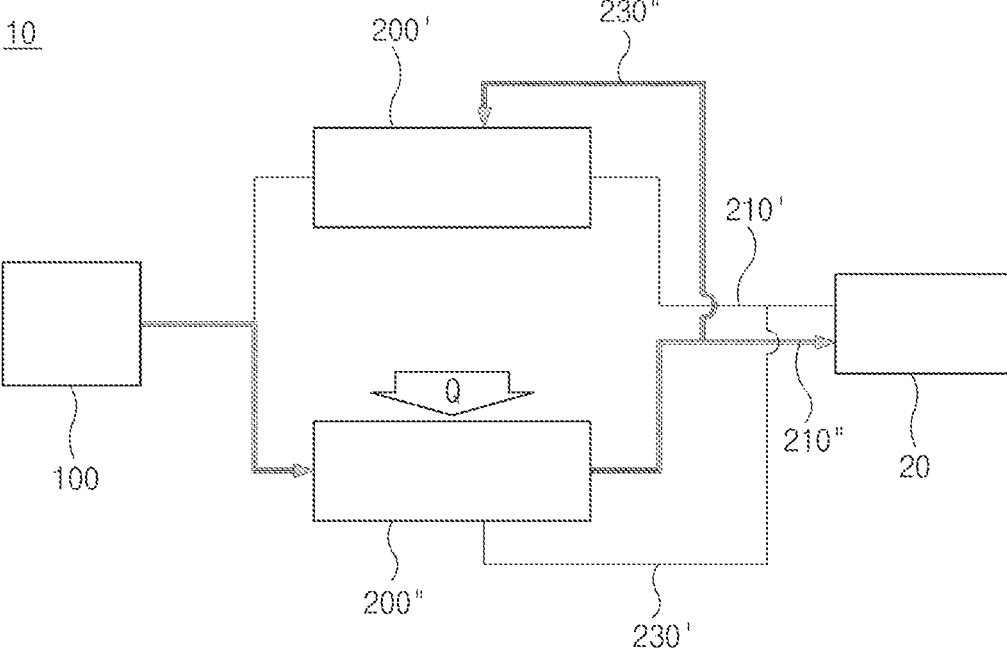
FIG. 5 is a view for explaining a process of treating hydrogen by using a second metal hydride compressor of the hydrogen supply system according to another embodiment of the present disclosure.

FIGS. 3 to 5 are views for explaining a hydrogen supply system 10 according to another embodiment of the present disclosure. Further, the parts identical and equivalent to the parts in the above-mentioned configuration will be designated by the identical or equivalent reference numerals, and detailed descriptions thereof will be omitted.

Referring to FIGS. 3 to 5, according to the exemplary embodiment of the present disclosure, the hydrogen supply system 10 may include a water electrolysis stack 100 configured to produce hydrogen by electrochemically decomposing water, and a first metal hydride compressor 200' connected to the water electrolysis stack 100 and configured to treat the hydrogen before supplying the hydrogen to a supply destination 20; a second metal hydride compressor 200" connected to the water electrolysis stack 100 in parallel with the first metal hydride compressor 200' and configured to treat the hydrogen before supplying the hydrogen to the supply destination 20. The system may further include a first supply line 210' connected to the first metal hydride compressor 200' and configured to supply the hydrogen to the supply destination 20, a first bypass line 230' having one end connected to the first supply line 210' and the other end connected to the second metal hydride compressor 200" and configured to selectively allow the hydrogen to flow from the first supply line 210' to the second metal hydride compressor 200", a second supply line 210" connected to the second metal hydride compressor 200" and configured to supply the hydrogen to the supply destination 20, and a second bypass line 230" having one end connected to the second supply line 210" and the other end connected to the first metal hydride compressor 200' and configured to selectively allow the hydrogen to flow from the second supply line 210" to the first metal hydride compressor 200'.

The first metal hydride compressor 200' is connected to the water electrolysis stack 100 and treats hydrogen produced by the water electrolysis stack 100 before supplying the hydrogen to the supply destination 20.

In this case, the configuration in which the first metal hydride compressor 200' treats the hydrogen may mean that the first metal hydride compressor 200' is used to refine, store, and compress the hydrogen.

The first metal hydride compressor 200' is a metal hydride-based thermal compressor. The first metal hydride compressor 200' may serve to remove impurities (oxygen and moisture) contained in hydrogen by using the properties of the metal hydride material, compress the hydrogen through a process of repeatedly heating and cooling the hydrogen, and store the hydrogen.

In particular, the first metal hydride compressor 200' may be made of a material containing at least any one of lanthanum (La) and titanium (Ti).

The first supply line 210' serves to supply the supply destination 20 with the hydrogen treated (refined, compressed, and stored) by the first metal hydride compressor 200'. The first bypass line 230' serves to selectively allow the hydrogen (high-purity hydrogen) moving along the first supply line 210' to flow to the second metal hydride compressor 200".

The second metal hydride compressor 200" is connected to the water electrolysis stack 100 in parallel with the first metal hydride compressor 200' and treats the hydrogen produced by the water electrolysis stack 100 before supplying the hydrogen to the supply destination 20.

In this case, the configuration in which the second metal hydride compressor 200" treats the hydrogen may mean that the second metal hydride compressor 200" is used to refine, store, and compress the hydrogen.

The second metal hydride compressor 200" is a metal hydride-based thermal compressor. The second metal hydride compressor 200" may serve to remove impurities (oxygen and moisture) contained in hydrogen by using the properties of the metal hydride material, compress the hydrogen through a process of repeatedly heating and cooling the hydrogen, and store the hydrogen.

In particular, the second metal hydride compressor 200" may be made of a material containing at least any one of lanthanum (La) and titanium (Ti).

The second supply line 210" serves to supply the supply destination 20 with the hydrogen treated (refined, compressed, and stored) by the second metal hydride compressor 200". The second bypass line 230" serves to selectively allow the hydrogen (high-purity hydrogen) moving along the second supply line 210" to flow to the first metal hydride compressor 200'.

The first metal hydride compressor 200' and the second metal hydride compressor 200" treat the hydrogen produced by the water electrolysis stack 100 while operating alternately.

This is to continuously treat hydrogen produced by the water electrolysis stack 100 without stopping the production of the hydrogen.

Since the first metal hydride compressor 200' and the second metal hydride compressor 200" operate alternately as described above, it is possible to continuously treat the hydrogen produced by the water electrolysis stack 100 without stopping the production of the hydrogen.

That is, referring to FIG. 4, when the first metal hydride compressor 200' operates, the hydrogen produced by the water electrolysis stack 100 may be treated (refined, compressed, and stored) by the first metal hydride compressor 200' and then supplied to the supply destination 20 along the first supply line 210'.

For reference, the hydrogen may be treated (refined and compressed) by heat Q applied to the first metal hydride compressor 200' while the first metal hydride compressor 200' operates.

In addition, a part of the hydrogen (high-purity hydrogen) moving along the first supply line 210' may flow to the second metal hydride compressor 200" along the first bypass line 230', and the second metal hydride compressor 200" may be regenerated (reduced) by the hydrogen supplied along the first bypass line 230'.

In contrast, as illustrated in FIG. 5, when the second metal hydride compressor 200" operates, the supply of the hydrogen to the first metal hydride compressor 200' may be cut off, and the hydrogen produced by the water electrolysis stack 100 may be supplied to the second metal hydride compressor 200" and then treated. Thereafter, the hydrogen refined by the second metal hydride compressor 200" may be supplied to the supply destination 20 along the second supply line 210".

For reference, the hydrogen may be treated (refined and compressed) by heat Q applied to the second metal hydride compressor 200" while the second metal hydride compressor 200" operates.

In addition, a part of the hydrogen (high-purity hydrogen) moving along the second supply line 210" may flow to the first metal hydride compressor 200' along the second bypass line 230", and the first metal hydride compressor 200' may be regenerated (reduced) by the hydrogen supplied along the second bypass line 230".

According to the embodiment of the present disclosure described above, since the first metal hydride compressor 200' and the second metal hydride compressor 200" operate alternately, the second metal hydride compressor 200" may be regenerated while the first metal hydride compressor 200' treats the hydrogen, and the first metal hydride compressor 200' may be regenerated while the second metal hydride compressor 200" treats the hydrogen. Therefore, it is possible to continuously treat the hydrogen produced by the water electrolysis stack 100 without stopping the production of the hydrogen. Therefore, the high-purity hydrogen may be continuously supplied to the supply destination 20, which makes it possible to obtain an advantageous effect of improving the efficiency in producing hydrogen and reducing the manufacturing costs.

In addition, according to the exemplary embodiment of the present disclosure, the hydrogen supply system 10 may include: a first discharge line (not illustrated) connected to the first metal hydride compressor 200' and configured to discharge impurities (oxygen and moisture) separated from hydrogen to the outside; and a second discharge line (not illustrated) connected to the second metal hydride compressor 200" and configured to discharge the impurities (oxygen and moisture) separated from the hydrogen to the outside.

Meanwhile, in the embodiment of the present disclosure illustrated and described above, the example has been described in which the hydrogen supply system 10 includes the first metal hydride compressor 200' and the second metal hydride compressor 200" connected in parallel with each other. However, according to another embodiment of the present disclosure, three or more metal hydride compressors may be used to constitute the hydrogen supply system. The present disclosure is not restricted or limited by the number of metal hydride compressors and the arrangement structure of the metal hydride compressors.

In addition, in the embodiment of the present disclosure illustrated and described above, the example has been described in which the hydrogen supply system 10 includes the plurality of metal hydride compressors 200 (the first metal hydride compressor and the second metal hydride compressor) connected in parallel with each other and the plurality of metal hydride compressors 200 alternately perform the processes of refining and compressing hydrogen. However, according to another embodiment of the present disclosure, the plurality of metal hydride compressors may simultaneously perform the processes of refining and compressing hydrogen.

According to the embodiment of the present disclosure described above, it is possible to obtain an advantageous effect of simplifying the structure and treatment process and improve the spatial utilization and degree of design freedom.

In particular, according to the embodiment of the present disclosure, it is possible to effectively remove oxygen and moisture from hydrogen produced by the water electrolysis stack without separately providing a plurality of refinement facilities (e.g., a water trap, a dryer, and an oxygen separator) for removing oxygen and moisture from hydrogen produced by the water electrolysis stack.

In addition, according to the embodiment of the present disclosure, it is possible to compress or store hydrogen while refining hydrogen produced by a water electrolysis stack by using only a single metal hydride compressor.

In addition, according to the embodiment of the present disclosure, it is possible to obtain an advantageous effect of improving production efficiency and reducing manufacturing costs.

In addition, according to the embodiment of the present disclosure, it is possible to obtain an advantageous effect of simplifying the structure and process for regenerating the metal hydride compressor.

While the embodiments have been described above, the embodiments are just illustrative and not intended to limit the present disclosure. It can be appreciated by those skilled in the art that various modifications and applications, which are not described above, may be made to the present embodiment without departing from the intrinsic features of the present embodiment. For example, the respective constituent elements specifically described in the embodiments may be modified and then carried out. Further, it should be interpreted that the differences related to the modifications and applications are included in the scope of the present disclosure defined by the appended claims.

The invention claimed is:

1. A hydrogen supply system comprising:

a water electrolysis stack configured to produce hydrogen by electrochemically decomposing water;

a metal hydride compressor connected to the water electrolysis stack and configured to treat the hydrogen before supplying the hydrogen to a supply destination;

a supply line connected to the metal hydride compressor and configured to supply the supply destination with the hydrogen treated by the metal hydride compressor;

a storage unit configured to store the hydrogen independently of the metal hydride compressor;

a bypass line having one end connected to the supply line and an other end connected to the storage unit, wherein the bypass line is configured to selectively allow the hydrogen to flow from the supply line to the storage unit; and a regeneration line having one end connected to the storage unit and an other end connected to the metal hydride compressor, wherein the regeneration line is configured to selectively supply the hydrogen from the storage unit to the metal hydride compressor.

2. The hydrogen supply system of claim 1, wherein the storage unit is made of a metal hydride material.

3. The hydrogen supply system of claim 1, comprising:

a discharge line connected to the metal hydride compressor, wherein the discharge line is configured to discharge impurities separated from the hydrogen to the outside.

4. The hydrogen supply system of claim 1, wherein the metal hydride compressor is made of a material containing at least any one of lanthanum (La) and titanium (Ti).

5. The hydrogen supply system of claim 1, wherein the metal hydride compressor is further configured to refine, store, and compress the hydrogen.

* * * * *